US006704302B2

(12) United States Patent
Einbinder et al.

(10) Patent No.: US 6,704,302 B2
(45) Date of Patent: *Mar. 9, 2004

(54) PORT PRIORITIZING DEVICE

(75) Inventors: Saul Joseph Einbinder, Monmouth, NJ (US); Michael Robert Lundberg, Monmouth, NJ (US); Scott A. Magnuson, Monmouth, NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,137

(22) Filed: Feb. 4, 1999

(65) Prior Publication Data

US 2004/0008709 A1 Jan. 15, 2004

(51) Int. Cl.[7] .................... H04L 12/413; H04L 12/56
(52) U.S. Cl. .................... 370/352; 370/389; 370/447; 370/461; 370/463
(58) Field of Search ................... 370/352, 353, 370/354, 389, 401, 420, 445, 447, 461, 462, 463; 379/88.17, 93.01, 93.05, 93.06, 93.07, 93.09; 709/232, 238, 250

(56) References Cited

U.S. PATENT DOCUMENTS

| 4,623,886 | A | * | 11/1986 | Livingston | 340/825.5 |
|---|---|---|---|---|---|
| 4,707,831 | A | * | 11/1987 | Weir et al. | 370/94 |
| 4,750,171 | A | * | 6/1988 | Kedar et al. | 370/85 |
| 5,276,899 | A | * | 1/1994 | Neches | 395/800 |
| 5,384,766 | A | * | 1/1995 | Yamato et al. | 370/13 |
| 5,463,616 | A | * | 10/1995 | Kruse et al. | 370/24 |
| 5,751,712 | A | * | 5/1998 | Farwell et al. | 370/431 |
| 5,812,656 | A | * | 9/1998 | Garland et al. | 379/208 |
| 5,841,778 | A | * | 11/1998 | Shaffer et al. | 370/447 |
| 5,892,764 | A | * | 4/1999 | Riemann et al. | 370/401 |
| 5,940,399 | A | * | 8/1999 | Weizman | 370/445 |
| 5,982,779 | A | * | 11/1999 | Krishnakumar et al. | 370/447 |
| 6,215,789 | B1 | * | 4/2001 | Keenan et al. | 370/399 |
| 6,272,147 | B1 | * | 8/2001 | Spratt et al. | 370/447 |

* cited by examiner

Primary Examiner—Alpus H. Hsu

(57) ABSTRACT

A port prioritizing device that interfaces a computer device and a telecommunications terminal device with a data network that is normally used exclusively for carrying data associated with computer devices. The port prioritizing device accepts packetized data from the computer and the telecommunications devices, merges that data and sends it out to the data network. The port prioritizing device provides a higher priority for data packets from the telecommunications device, by blocking the transmission of computer data packets while telecommunications data packets are being sent.

9 Claims, 5 Drawing Sheets

PORT PRIORITIZING DEVICE

FIELD OF THE INVENTION

This invention relates to apparatus for facilitating the transmission of voice and data across a Local Area Network (LAN) and, more particularly, to a port prioritizing device which gives priority to voice-containing packets, over data packets, to ensure high voice quality transmission over the LAN.

BACKGROUND OF THE INVENTION

A variety of approaches have been explored throughout the telephone and data networking industries for carrying telephone communications across Local Area Networks (LAN's). Widespread deployment of such telephone systems, though, has been slow for a variety of reasons, including concerns about voice quality. One key component of the voice quality issue is the timely delivery of voice-containing packets across an LAN. Timely delivery of voice-containing packets results from the problem of contention between voice frames and data frames originating in the endpoint.

Traditional voice telephone is based on the guaranteed timely arrival of each successive voice sample at the listening endpoint. Dedicated channels through the existing STM network are designed to support just such timely transport of the voice traffic. LAN networks, on the other hand, share a common channel among many endpoints, providing access to potentially greater amounts of bandwidth at the expense of guaranteed timely access. While this is an excellent compromise for near-real-time applications such as file transfer, World Wide Web access, etc., when applied to real-time applications like voice communications, the resulting performance is poor, with drop-outs and distortion in the received voice stream.

As the data networking world advances, network ports are becoming less and less expensive. Dedicated switched ports will soon cost as little as shared ports did just a few years ago, and will be competitive with the cost of telephone ports. With dedicated switched Ethernet, much of the real-time data quality problem lies in the sharing of the network port between the real-time applications (i.e., voice) and the non-real-time applications.

Various proposals to establish a priority mechanism for Ethernet LAN's have been put forth in the prior art. These approaches attempt to provide a higher priority for the real-time data, with thus a slight advantage over the non-real-time data. These approaches, however, necessitate modifying the computer workstation, either by installing new hardware or software, which is a disadvantage both in terms of cost and the time necessary to retrofit the computer workstation.

It is, therefore, an object of this invention to provide high quality voice transmission over a data network, such as a LAN, without the necessity to retrofit computer work stations associated with the LAN.

It is a further object of this invention to provide high quality voice transmission over a data network, such as a LAN, without disrupting the flow of data between the associated work stations.

It is a still further object of this invention to provide a simple and inexpensive device, easily connected to a data network, which allows high quality voice transmission over the data network without disrupting the flow of data.

SUMMARY OF THE INVENTION

In accordance with this invention, the aforementioned deficiencies are addressed and improvement is made in the art by the provision of a Port Prioritizing Device (PPD) that interfaces a computer device and a telecommunications terminal device, such as, for example, a telephone, with a data network that is typically used exclusively for carrying data associated with computer devices.

According to the present invention, the port prioritizing device is powered independently from the computer device. It accepts packetized data from each interface, and merges those data and sends them out to the data network. In doing so, the device provides a higher priority for packets from the telecommunications device, by blocking the transmission of computer packets while telecommunications packets are being sent. The invention is particularly unique in that its proper operation does not depend on changes in design of existing computer network equipment such as Network Interface Cards (NICs), hubs, or switches.

It is a feature of the invention that blocking transmission of computer packets is accomplished by transmitting real-time packets (i.e., voice) to both the network and the data endpoint, so that the data endpoint will think that the network is busy.

It is a further feature of the invention that real-time data packets are given priority without the necessity of examining bits in each data packet to determine priority.

The foregoing and other objects and features of this invention will be more fully understood from the following description of an illustrated embodiment thereof taken in conjunction with the accompanying drawings.

DETAILED DESCRIPTION

Figure 1:
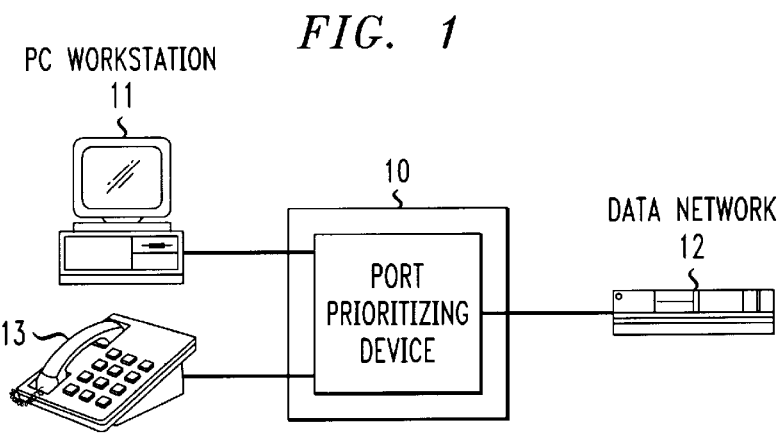
FIG. 1 illustrates, in block diagram form, the use of the invention in conjunction with a data network.

Referring now to FIG. 1, there is shown a block diagram of the invention as installed in a data network. The data network, such as a LAN, is graphically shown at 12. PC workstation 11, is the data endpoint used to send and receive data over data network 12. Telephone 13 provides the ability to send and receive real-time information (i.e., voice data packets) over data network 12. Port Prioritizing Device (PPD) 10 connects both workstation 11 and telephone 13 to data network 12.

PPD 10 is able to pass the non-real-time frames between the network 12 and the workstation 11, and to insert and remove real-time frames as the real-time voice application requires. In addition, when it has real-time frames to send, it switches the network link away from the workstation port and into its own telephone port, thus giving the real-time application the same slight priority advantage over the non-real-time data that the software/hardware endpoint schemes are able to provide. The additional advantage is that no hardware or software modification to the workstation is required.

Most current Ethernet endpoint connections are half duplex, i.e., traffic only flows in one direction at a time. The PPD 10 hardware listens to the link between the workstation 11 and the data network 12. If telephony application frames are waiting to be sent, and the data network connection is idle, PPD 10 switches the connection over to the telephone application, and initiates the frame transfer. At the same time, it generates traffic towards the workstation 11, thus inhibiting it from sending any new data. When it completes sending the telephone application frames, it then switches the connection back to PC workstation 11. The PPD/Telephone Application monitors all data sent from the Data Network towards the workstation, and collects any Telephony Application frames which are addressed to the Telephone 13. The scheme takes advantage of the timing margins that are an essential part of 10 base T-Ethernet.

Giving priority to the real-time data does not disrupt the flow of data over data network 12. Most voice messages are very short and, worst case, would occupy one (1%) percent to two (2%) percent of the total bandwidth of the network. Therefore, since the real-time information (i.e., voice packets) is a low bandwidth application and data transfers from workstation 11 is a high bandwidth application, giving priority to voice messages does not disrupt data transfer through the network.

A typical application for use with this invention is the addition of voice capability to a premises data network, i.e., a data network that has been installed in one building for data transfer between work stations. Most current applications require separate wiring for the data network and a separate voice network. This obviously doubles the expense for wiring the building for both voice and data.

This duplication is not necessary with the instant invention. After installation of the data network in the building, a PPD would be installed in conjunction with each workstation and telephone as shown in FIG. 1. The data network would then be capable of handling voice and data as two separate networks do currently for voice and data. Cost for the network is, therefore, substantially less, as only one set of connections have to be installed, and only one network must be maintained.

PPD 10 is one means of a weighted interface which provides one port an advantage to LAN medium access over other ports. International Standard ISO/IEC 802.3 (CD/CSMA) specifies that a weighted interface is avoided to permit all devices on the LAN medium equal access to the medium. In the case of the telephone/computer combination as depicted in FIG. 1, the purpose of the PPD is to allow the phone an advantage over the PC Workstation. For the sake of simplicity, the current discussion details a two port interface, but can be extended to a larger set of ports. The phone gains advantage over the PC Workstation by decision logic of the PPD.

The 802.3 CD/CSMA protocol describes a means of allowing multiple endpoints to occupy a serial bus and attempt fair access. Each endpoint monitors the medium. Should the medium be busy, then all idle endpoints on the bus wait until the medium is unoccupied, then each endpoint starts an interframe gap period timer. Once the interframe gap has expired, all endpoints which have data queued can transmit. If N endpoints have data to transmit, N endpoints start to transmit which creates a collision. When a collision occurs on the medium, all transmitting endpoints send a JAM signal to ensure all other endpoints recognize the collision. After the JAM transmission, the colliding endpoints enter a "truncated binary exponential back-off." Based upon K attempts at accessing the medium, the colliding endpoints increase the size of a uniformly distributed random integer to determine how many slot times to wait prior to attempting medium access.

In contrast, PPD 10 creates a weighted interface based upon decision circuitry and propagation velocity of signals through the medium. Take the case of two endpoints trying to vie for the same medium segment within a limited distance. It can be assumed that these endpoints are interframe gap synchronized; the upper limit of this on a 10M LAN is $1/10e^6$ Mhz=100 ns ∴ 100 ns/(4.97 ns/m)=20 m. By limiting the total medium distance difference to under 20 m(59 ft), we can ensure the two endpoints are interframe synchronized at the PPD. When the PC workstation(11) and the Phone(13) of FIG. 1 have data to transmit, each attempts to transmit simultaneously. Decision logic is used to block the PC Workstation from colliding with the phone, thus permitting the phone to transmit while the PC workstation sees a collision and enters the back-off algorithm; in this manner the phone is given priority. Assuming the Phone does not collide with data from the Network(12), the PC Workstation will gain access to the medium on its next attempt, since the Phone transmits at a lower rate than the Workstation.

Figure 2:
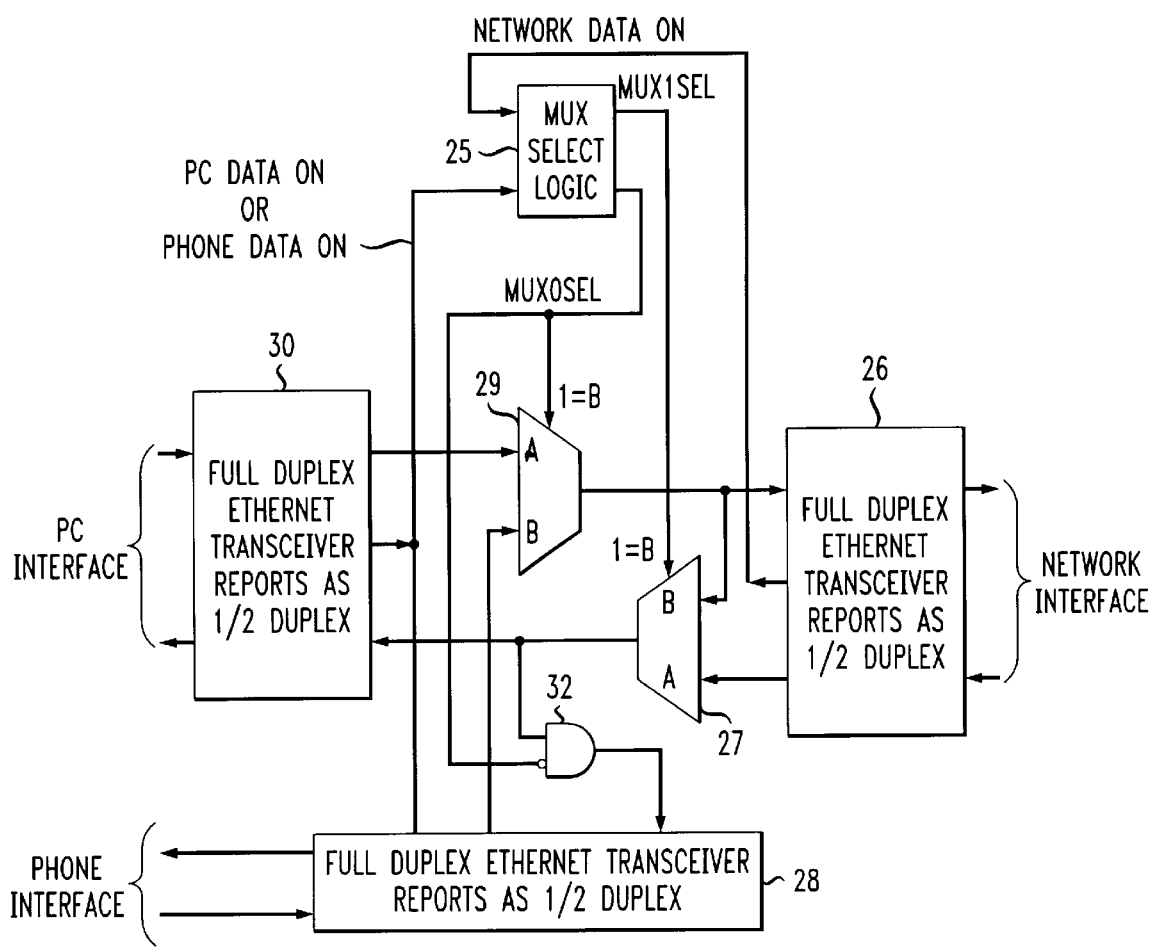
FIG. 2 illustrates, in greater detail, the PPD of the instant invention, as used with the embodiment of FIG. 1.

Referring now to FIG. 2, there is shown a first embodiment of PPD 10. The Data Network 12, the Phone 13 and the PC workstation 11 are all connected to the PPD 10 via full duplex Ethernet transceivers 26, 28 and 30 respectively. Mux Select Logic 25 determines which data system should be chosen for either of multiplexers 27 or 29 based on the data activity received from Ethernet interfaces 26, 28 or 30 as described above.

The operation of Mux Select Logic 25 in FIG. 2 can be understood from the following Table 1, where a "1" indicates that data is being received from a particular source and an "0" indicates that no data is being received from a particular source. Also, an "0" or "1" (0=A, 1=B) indicates which input port of either Mux 27 or Mux 29 is selected to pass the data to the Mux output.

TABLE 1

| NETWORK DATA | PC DATA | PHONE DATA | MUX 29 MUX "O" SEL | MUX 27 MUX "I" SEL |
|---|---|---|---|---|
| 0 | 0 | 0 | 1 | 1 |
| 0 | 0 | 1 | 1 | 1 |
| 0 | 1 | 0 | 0 | 0 |
| 0 | 1 | 1 | 1 | 1 |
| 1 | 0 | 0 | 1 | 0 |
| 1 | 0 | 1 | 1 | 0 |
| 1 | 1 | 0 | 0 | 0 |
| 1 | 1 | 1 | 1 | 0 |

Logic gate 32 allows data to be either blocked or transmitted to Transceiver 28 depending on the outputs of Mux Select Logic 25 and Mux 29 as indicated.

Figure 3:
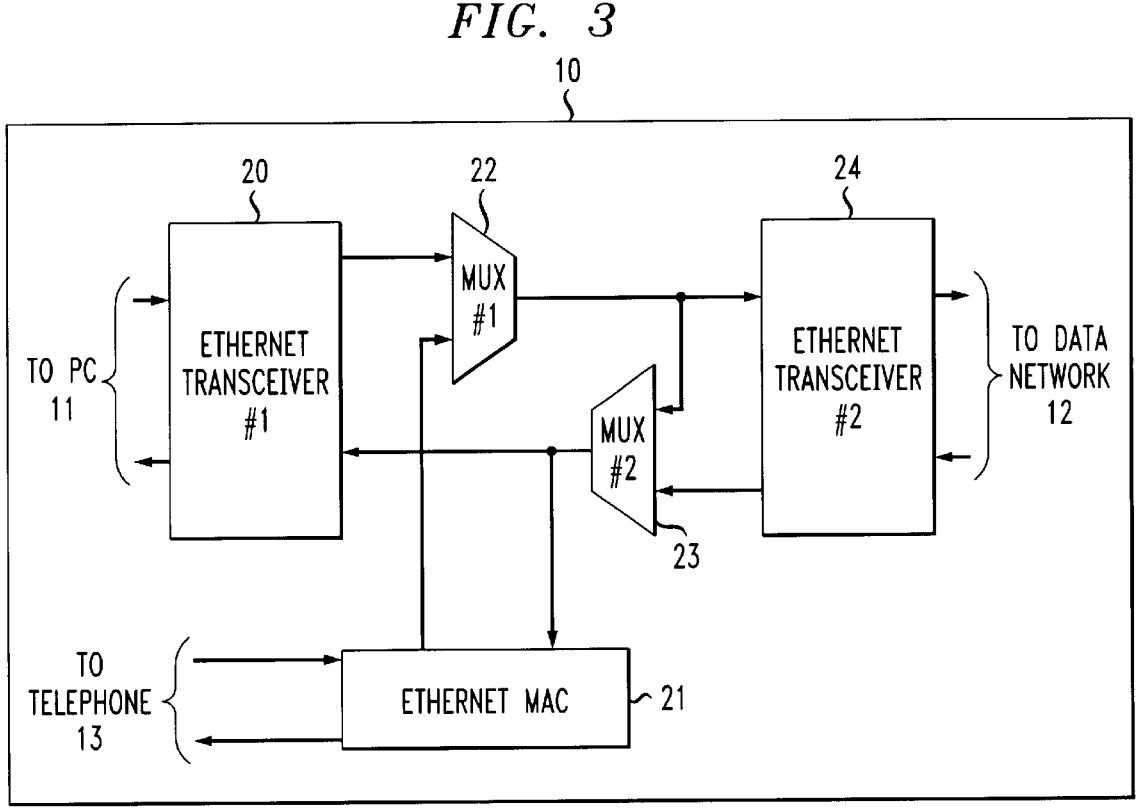
FIG. 3 illustrates a block diagram of a second embodiment of the PPD.

Referring now to FIG. 3, the Port Prioritizing Device 10 of this embodiment consists of two Ethernet transceivers, 20, 24, multiplexors (muxes) 22, 23 for steering the communication streams, and an Ethernet MAC device 21 for terminating the telephony application stream. The Transceivers 20, 24 terminate the physical layer, transmit and receive the communication streams, and provide indications of carrier sense for collision detection on their respective interfaces.

If there are no real-time telephony packets being sent, then Data Packets flowing from the PC workstation 11 to the Data Network 12 enter PPD 10 through Ethernet Transceiver #1 shown at 20. Once a data bit has entered the Transceiver 20, the PPD 10 forwards it through Mux #1 at 22 to Ethernet Transceiver #2 at 24, and on to the Data Network 12. Likewise, data bits from the Data Network 12 enter Ethernet Transceiver #2 at 24, and are forwarded to Ethernet Transceiver #1 at 20, and on to the PC workstation 11. When a real-time packet from the Telephone Interface 13 is queued in the Ethernet MAC 21, the PPD will take "ownership" of the receiver immediately, if no packets are currently in transit through the PPD, or immediately following any packet which is in transit. The PPD will then send the real-time packet to both the Network (so it will get to its intended destination), as well as to the data Endpoint (so that it will see that the network is busy). Real-time packets which are destined for the Telephone interface will simply be grabbed "as they go by" (meaning that they will get to both the PC Workstation, as well as the Telephone Interface's Ethernet MAC).

Ethernet MAC 21 generates voice messages originating from telephone 13 as described below.

Figure 4:
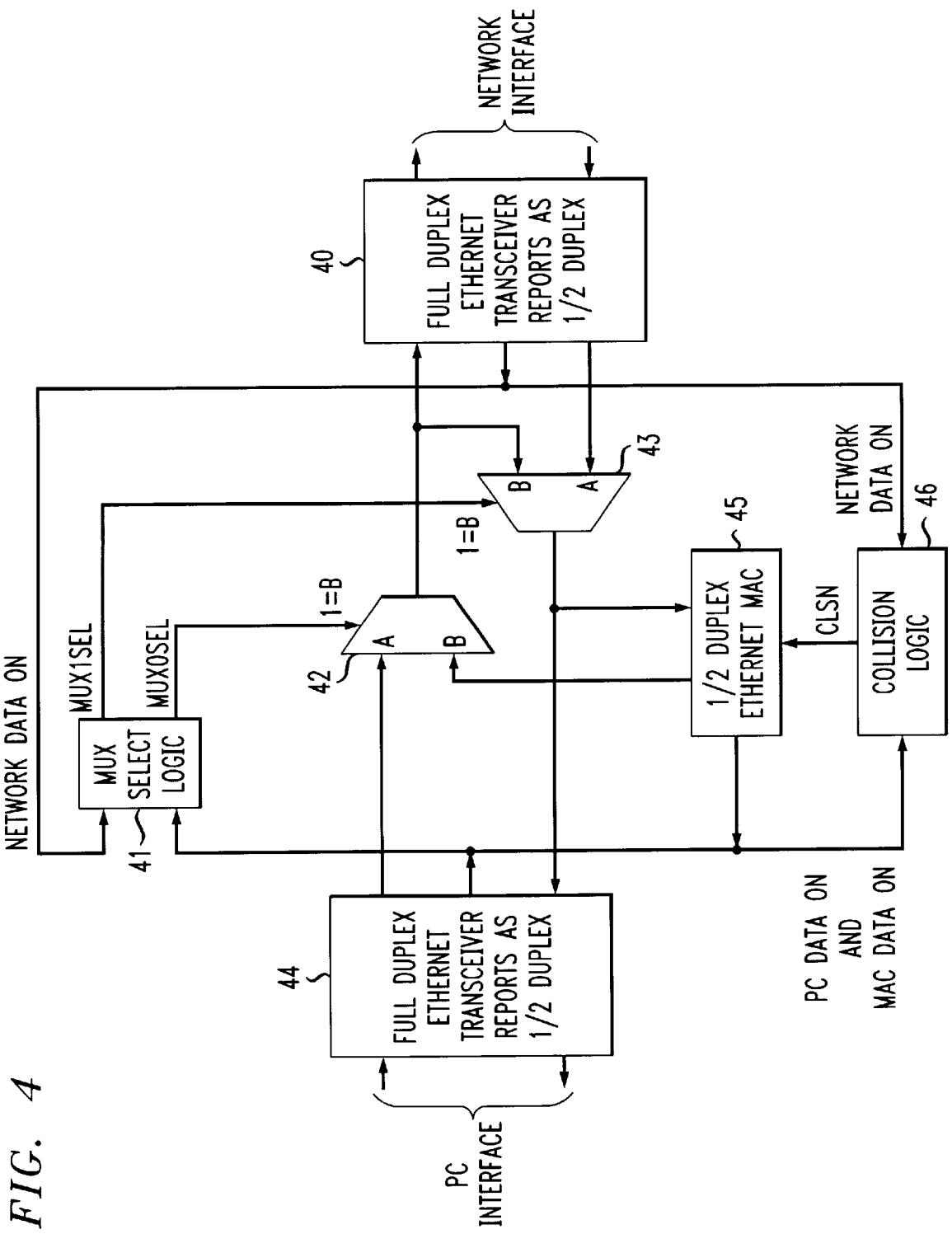
FIG. 4 illustrates the embodiment of FIG. 3 in greater detail.

Referring now to FIG. 4, there is shown a more detailed illustration of the embodiment shown in FIG. 3, which incorporates Mux Select Logic and collision logic not shown in FIG. 3. Mux Select Logic 41 operates in the same manner as described with respect to Mux Select Logic 25 in FIG. 2. Transceivers 40 and 44 in FIG. 4 operate in the same manner as Transceivers 20 and 24 in FIG. 3, and Transceivers 26 and 30 in FIG. 2. Similarly, multiplexers 42 and 43 in FIG. 4 operate in the same manner as to multiplexers 22 and 23 in FIG. 3, and multiplexers 27 and 29 in FIG. 2. Operation of Ethernet MAC 45 in FIG. 4 is the same as described above with respect to Ethernet MAC 21 in FIG. 3. Also, the telephone connection is provided by Ethernet MAC 45.

The MAC is a standard Ethernet device which means Medium Access Controller. It is the device which implements the back-off algorithm and controls medium access. The MAC has to be in the phone, and is connected to a microprocessor inside the phone. In the implementation being discussed, the PPD is part of the phone internal circuitry.

Also shown in FIG. 4 is collision logic 46. Operation of this device is based upon the activity from the Transceivers 40 and 44 and determines whether there is a collision between the competing sources of data for transmission over the network. Based upon the timing between the arrival of PC data and the MAC data, priority is given to the MAC data by the collision logic.

Table 2 below is a state table for the embodiment of the PPD shown in FIG. 4. In Table 2, the symbol "x" means that the PPD does not care whether this state is a "1" or a "0." The "CLSN" designation represents the output of collision logic 46.

TABLE 2

| PRESENT | INPUTS | | | NEXT | | OUTPUT | |
|---|---|---|---|---|---|---|---|
| MAC DATA | PC DATA | NETWORK DATA | | | | | |
| ON | ON | ON | CLSN | | CLSN | | COMMENTS |
| zero | 0 | X | X | X | zero | 0 | No CSLN so remain idle |
| zero | 0 | 1 | X | X | one | 0 | PC here first so set up for potential collision |
| zero | 1 | X | 0 | X | two | 0 | Gives MAC priority over PC |
| zero | 1 | 0 | 1 | X | three | 1 | Collision with switch |
| one | 0 | 1 | X | X | one | 0 | Wait until NIC done |
| one | 0 | 0 | X | X | zero | 0 | PC stopped so return to idle |
| one | 1 | 1 | X | X | three | 1 | Collision with PC |
| two | 1 | X | 0 | X | two | 0 | MAC has priority over PC |
| two | 1 | X | 1 | X | three | 1 | Collides with switch |
| two | 0 | X | 0 | X | zero | 0 | MAC done so go to idle |
| three | 1 | 1 | X | X | three | 1 | Keep high until collision ends |
| three | 1 | X | 1 | X | three | 1 | Keep high until collision ends |
| three | X | 0 | 0 | X | zero | 0 | Collision over |

A natural extension of the aforementioned (MAC) implementation which allows the PPD to be independent of the medium length requirement is to modify the standard Ethernet MAC. In this implementation the MAC could be changed (redesigned) to include a signal to indicate to the decision circuitry (collision logic) that a data packet is available, such an implementation removing the requirement of waiting for a collision. Instead as soon as the MAC has data and both network interfaces are idle the PPD can seize the network with greater priority over the workstation.

Figure 5:
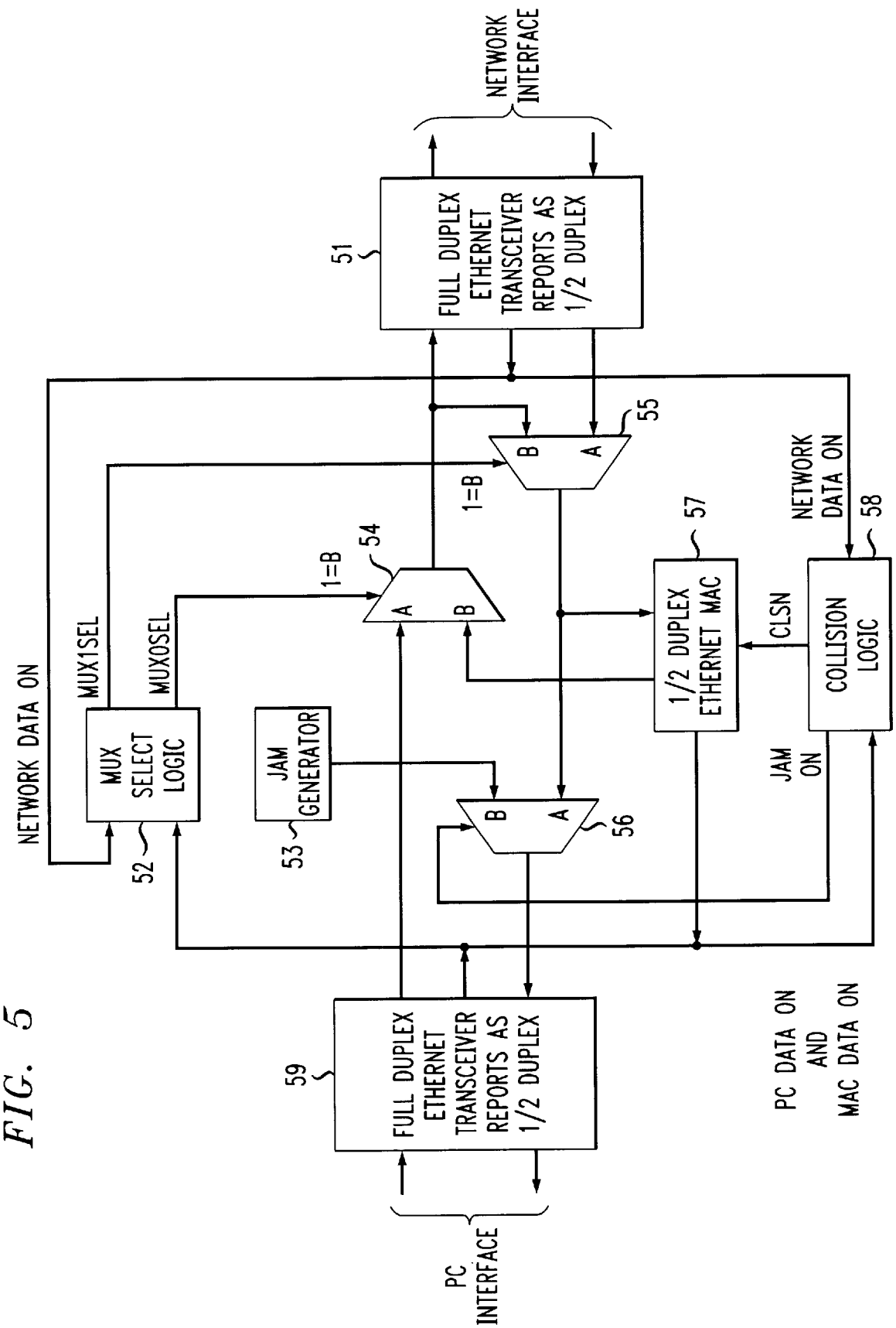
FIG. 5 illustrates a still further embodiment of the invention which makes use of a JAM Generator.

FIG. 5 shows an implementation of the PPD which provides a higher level of priority to the Phone MAC over the PC Workstation than the implementation discussed earlier. As with the case of the modified MAC, this implementation is medium length independent. The priority of the Phone over the PC Workstation exists as discussed for FIG. 1, however, additional logic queues a collision between the Phone and the PC Workstation. The collision state is used to allow the Phone greater priority. This is accomplished by the logic remembering the PC Workstation collided with the Phone and, thus, the Phone has data to transmit. The PC Workstation and the Phone go into their normal back-off algorithms. Should the PC Workstation get the benefit of a lower back-off period, the Collision logic 58 activates the JAM generator 53, causing the PC Workstation to see a collision and enter a new back-off state. The Phone MAC 57 has the benefit of uncontended access to the link so long as data from the Network is not present. Once the Phone has transmitted its data, the queued collision state is relinquished until it occurs again. Table 2, above, would be expanded to add more states for the operation of the PPD embodiment shown in FIG. 5.

FIG. 5 shows JAM generator 53, the function of which is described in the 802.3 specification. JAM generator 53 generates the JAM command, applied to multiplexer 56 which signals the PC that there is incoming data on the other portion of the network. Multiplexer 56 steers the data based on signals from MUX select logic 52.

The remaining devices shown in FIG. 5, i.e., Muxes 54 and 55, Transceivers 51 and 59, Mux Select Logic 52, Ethernet MAC 57 and Collision Logic 58 operate in the same manner as the equivalent elements set forth in FIG. 4. That is Muxes 54 and 55 in FIG. 5 are equivalent to Muxes 42 and 43 in FIG. 4, Mux Select Logic 52 in FIG. 5 is equivalent to Mux Select Logic 41 in FIG. 4, Ethernet Mac 57 in FIG. 5 is equivalent to Ethernet MAC 45 in FIG. 4, and Transceivers 51 and 59 are equivalent to Transceivers 40 and 44 in FIG. 4.

Figure 5A:
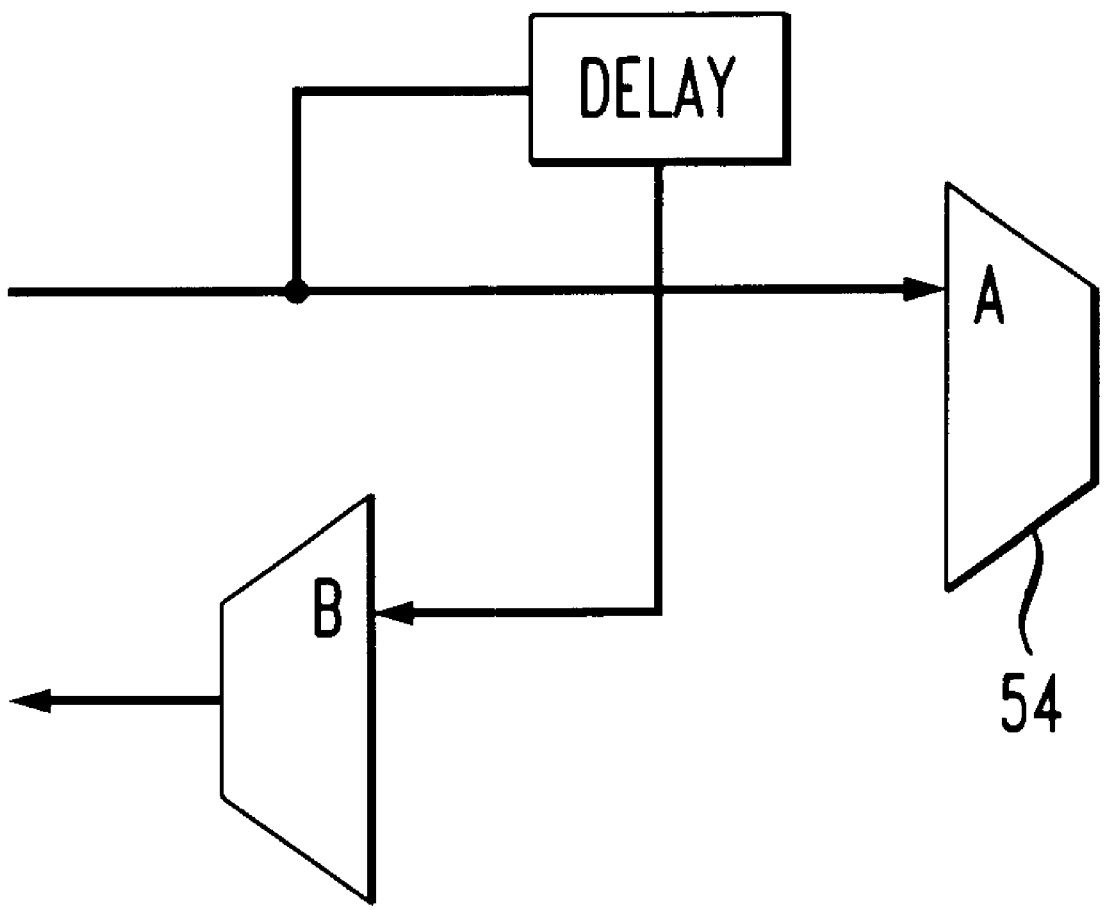
FIG. 5A illustrates a delay modification to FIG. 5.

JAM generator 53 in FIG. 5 can also be replaced by a Delay block, as shown in FIG. 5A. In this configuration, the connection between Transceiver 59 and MUX 54 is tapped and that connection is directed to the Delay generator, which replaces JAM generator 53. With this configuration, what is provided is a means of using the PC's own transmitted data to loop back to the PC interface to cause the PC to activate the back-off algorithm, described above.

What has been shown and described is a port prioritizing device which advantageously allows high quality voice transmission and data transmission over a high speed data network by giving priority to voice transmissions. The port prioritizing device is extremely simple and does not require examining bits in the data packets to determine priority. Although a specific embodiment of this invention has been discussed above, it will be understood that various modifications may be made without departing from the spirit of this invention.

What is claimed is:

1. A port prioritizing device for interfacing a data endpoint and a telecommunications device with a data network, the data network carrying both information from the telecommunications device and the data endpoint, the port prioritizing device comprising, a first interface for connecting the data endpoint to the data network to thereby establish a communications link between the data network and the data endpoint, a second interface for connecting the telecommunications device to the data network to thereby establish a communications link between the telecommunications device and the data network, and logic circuitry ensuring that information from the telecommunications device has priority over information from the data endpoint when both the data endpoint and the telecommunications device simultaneously seek access to the data network;

said logic circuitry being configured to obtain said priority for the telecommunications device by transmitting digitized packets from the telecommunications device to the data network and to the data endpoint whereby the data endpoint determines that the data network is busy in response to receiving the digitized packets from the telecommunications device.

2. A port prioritizing device in accordance with claim 1, wherein said information from said telecommunications device and said information from said data endpoint are both in the form of digitized packets of information.

3. A port prioritizing device in accordance with claim 2, wherein said logic circuitry includes means for obtaining priority for said telecommunications device.

4. A port prioritizing device in accordance with claim 3, wherein said means for obtaining priority includes means for transmitting digitized packets from said telecommunications device to said data network and to said data endpoint.

5. A port prioritizing device in accordance with claim 1, wherein said data endpoint executes a back-off algorithm in response to receiving said digitized packets from said telecommunications device.

6. A port prioritizing device in accordance with claim 5, wherein said logic circuitry ensures priority without the necessity to examine bits in each digitized packet of information.

7. A port prioritizing device in accordance with claim 1, wherein said data endpoint comprises a computer.

8. A port prioritizing device in accordance with claim 1, wherein the information from the telecommunications device is sent to both the data network and the data endpoint.

9. A method for interfacing a data endpoint and a telecommunications device with a data network, the data network carrying both information from the telecommunications device and the data endpoint, the method comprising the steps of, establishing a communications link between the data network and the data endpoint via a first interface connecting the data endpoint to the data network, establishing a communications link between the telecommunications device and the data network via a second interface connecting the telecommunications device to the data network, and when both the data endpoint and the telecommunications device simultaneously seek access to the data network, transmitting digitized packets from the telecommunications device to the data network and to the data endpoint, whereby the data endpoint determines that the data network is busy in response to receiving the digitized packets from the telecommunications device.

* * * * *